(Model.)
J. H. McCONNELL & M. W. CHANDLER.
BASKET HANDLE.
No. 281,900. Patented July 24, 1883.
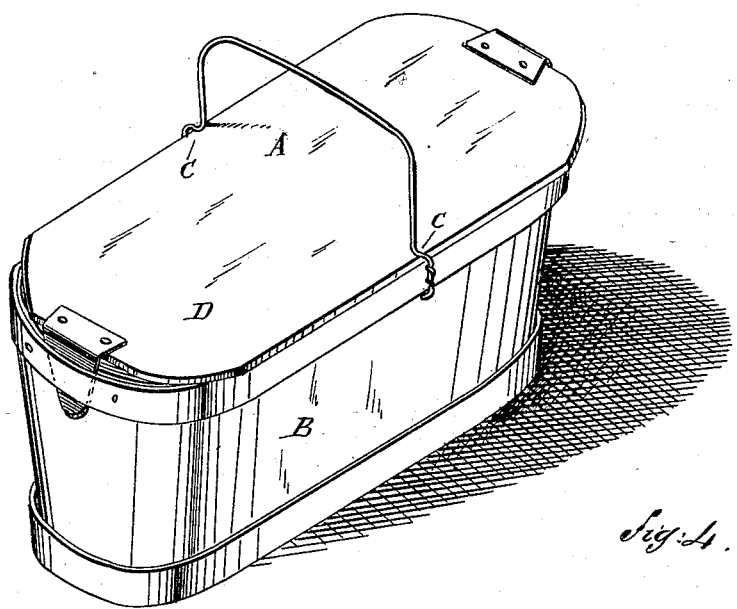
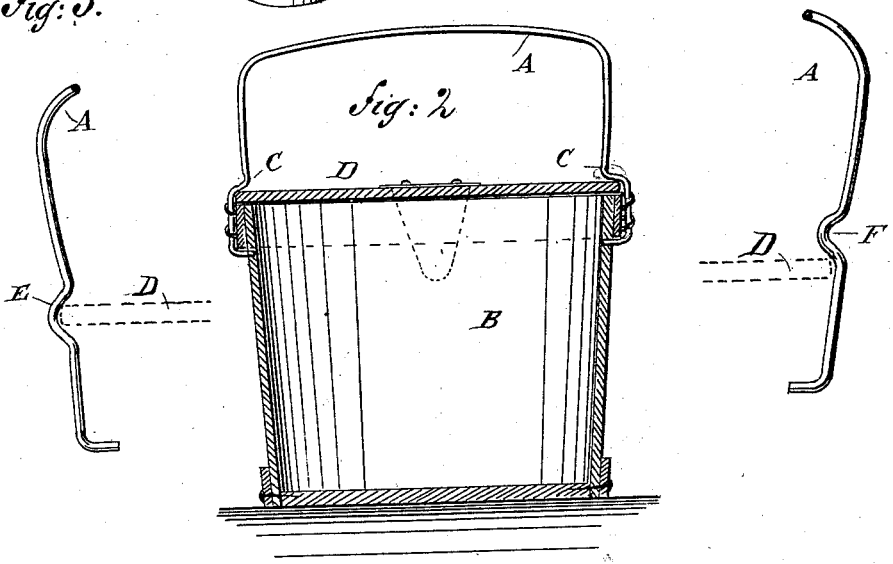
WITNESSES:
Chas. Nida
C. Sedgwick
INVENTOR:
J. H. McConnell
M. W. Chandler
BY Munn & Co
ATTORNEYS.
N. PETERS, Photo-Lithographer, Washington, D. C.

UNITED STATES PATENT OFFICE.

JAMES H. McCONNELL AND MELCHIOR W. CHANDLER, OF PULTNEY, N. Y.

BASKET-HANDLE.

SPECIFICATION forming part of Letters Patent No. 281,900, dated July 24, 1883.

Application filed December 20, 1882. (Model.)

*To all whom it may concern:*

Be it known that we, JAMES H. McCONNELL and MELCHIOR W. CHANDLER, both of Pultney, in the county of Steuben and State of New York, have invented a new and Improved Basket-Handle, of which the following is a full, clear, and exact description.

The object of our invention is to provide a new and improved basket-handle, which also serves to hold the cover on the basket at the middle of the side edges.

The invention consists in a basket-handle or bail provided with shoulders a short distance above the upper edges of the basket, under which shoulders the edges of the basket-cover are passed for the purpose of holding the cover on the basket at the middle of the side edges.

Reference is to be had to the accompanying drawings, forming part of this specification, in which similar letters of reference indicate corresponding parts in all the figures.

Figure 1 is a perspective view of a basket provided with our improved handle. Fig. 2 is a cross-sectional elevation of the same. Figs. 3 and 4 show longitudinal views of the ends of modifications of our improved handles.

A wire bail or handle, A, is secured to the sides of a basket, B, by means of wire, or in any other suitable manner. The bail or handle A is provided, a short distance above the upper edge of the basket, with inwardly-extending bends C, between which and the upper edge of the basket the cover D can be passed, whereby the cover will be held on the basket at the middle of the side edges.

If desired, the wire or bail can be provided with outward bends or kinks, E, into which the edge of the cover D is passed, as shown in Fig. 3; or it can be provided with inwardly-extending bends or kinks F, under which the edge of the cover D can be passed. In all cases the cover D will be held on the upper edge of the basket at the middle of the side edges of the cover. The cover can be withdrawn from the bends of the bail, and need not be apertured or provided with fastening devices to hold it down at the middle.

We provide the cover with any of the usual end fastenings. The bail or handle can be made of metal bands as well as of wire. In all cases the bend forms a shoulder under which the edge of the cover presses, which is thus held in place.

Having thus described our invention, what we claim as new, and desire to secure by Letters Patent, is—

The combination, with the basket B and the sliding cover D, of the wire bail A, provided with the inwardly-extending bends C, substantially as herein shown and described, and for the purpose set forth.

JAMES H. McCONNELL.
MELCHIOR W. CHANDLER.

Witnesses:
S. S. ELLSWORTH,
MINER A. McCONNELL.